United States Patent
Suski et al.

(10) Patent No.: US 9,198,438 B2
(45) Date of Patent: Dec. 1, 2015

(54) DOUGH FORMING AND CUTTING APPARATUS AND METHOD

(71) Applicant: General Mills, Inc., Minneapolis, MN (US)

(72) Inventors: Geoff Suski, Inver Grove Heights, MN (US); Frank Konkle, Elko, MN (US); Ed Francis, Carl Junction, MO (US); Peter A Huberg, Shoreview, MN (US)

(73) Assignee: General Mills, Inc., Minneapolis, MN (US)

( * ) Notice: Subject to any disclaimer, the term of this patent is extended or adjusted under 35 U.S.C. 154(b) by 68 days.

(21) Appl. No.: 14/145,456

(22) Filed: Dec. 31, 2013

(65) Prior Publication Data

US 2014/0113047 A1 Apr. 24, 2014

Related U.S. Application Data

(62) Division of application No. 12/644,167, filed on Dec. 22, 2009, now Pat. No. 8,622,730.

(60) Provisional application No. 61/140,432, filed on Dec. 23, 2008.

(51) Int. Cl.
*A21C 11/10* (2006.01)
*A21C 5/00* (2006.01)
(Continued)

(52) U.S. Cl.
CPC ............... *A21C 5/003* (2013.01); *A21C 11/10* (2013.01); *A21C 5/02* (2013.01); *A21C 5/08* (2013.01); *A21C 11/04* (2013.01); *A21C 11/08* (2013.01)

(58) Field of Classification Search
CPC ............ A21C 5/003; A21C 5/02; A21C 5/08; A21C 11/04; A21C 11/08; A21C 11/10
USPC .......... 426/512, 518; 425/202, 221, 235, 281, 425/278, 279, 292, 294, 298, 307, 308, 310, 425/312, 315, 316
See application file for complete search history.

(56) References Cited

U.S. PATENT DOCUMENTS 1,357,665 A * 11/1920 Watkins .................... 83/863
1,728,702 A    9/1929 Smith
(Continued)

FOREIGN PATENT DOCUMENTS

DE    827183    1/1952
DE    3332061   3/1985
(Continued)

OTHER PUBLICATIONS

The Moline Company, A Division of Pillsbury Company, Moline Bulletin 529, "Round Cutters", p. 1, printed in USA at least prior to 1991.

*Primary Examiner* — Seyed Masoud Malekzadeh
(74) *Attorney, Agent, or Firm* — Diedericks & Whitelaw, PLC; John L. Crimmins (57) ABSTRACT

An apparatus and method is provided for forming and cutting a dough sheet into a plurality of generally spherically shaped, boule-type dough products in a continuous process. The apparatus includes a rotatable drum and a plurality of cutter molds disposed on the rotatable drum for engaging, shaping and severing dough from the sheet as the dough sheet moves along the dough travel path. Each of the cutter molds including a peripheral edge portion, a base portion and a curved, annular side wall defining a concave, generally bowl-shaped internal cavity, with the peripheral edge portion establishing a cutting edge for the cutter mold.

14 Claims, 5 Drawing Sheets

(51) Int. Cl.
  *A21C 11/04* (2006.01)
  *A21C 11/08* (2006.01)
  *A21C 5/02* (2006.01)
  *A21C 5/08* (2006.01)

(56) References Cited

U.S. PATENT DOCUMENTS

| | | |
|---|---|---|
| 1,841,495 A | 1/1932 | Mears |
| 1,871,755 A | 8/1932 | Smith |
| 1,944,112 A | 1/1934 | Schröder |
| 1,945,755 A | 2/1934 | Scruggs, Jr. |
| 2,144,720 A | 1/1939 | Gibson |
| 2,230,778 A | 2/1941 | Flores |
| 2,246,424 A | 6/1941 | Turner |
| 2,346,839 A | 4/1944 | Harriss, et al. |
| 2,431,789 A | 12/1947 | Cosgrove |
| 2,525,987 A | 10/1950 | Williamson |
| 2,619,051 A | 11/1952 | Rice |
| 2,681,625 A | 6/1954 | Babbitt |
| 2,887,964 A | 5/1959 | Griner |
| 2,999,314 A | 9/1961 | Reichlein |
| 3,024,112 A | 3/1962 | Burgess |
| 3,154,986 A | 11/1964 | Reid |
| 3,225,718 A | 12/1965 | Page |
| 3,279,927 A | 10/1966 | Reid |
| 3,364,877 A * | 1/1968 | Zublena ............... 425/294 |
| 3,427,783 A | 2/1969 | Reid |
| 3,536,014 A | 10/1970 | Kuchuris et al. |
| 3,595,111 A | 7/1971 | Hershberger |
| 3,603,270 A | 9/1971 | Tangel |
| 3,872,757 A | 3/1975 | Hargadon |
| 3,880,030 A | 4/1975 | Rosengren |
| 3,880,069 A | 4/1975 | Moline |
| 3,911,805 A | 10/1975 | Baird |
| 4,193,272 A | 3/1980 | Bernard |
| 4,276,800 A | 7/1981 | Koppa et al. |
| 4,352,831 A | 10/1982 | Cavanagh et al. |
| 4,382,768 A | 5/1983 | Lifshitz et al. |
| 4,469,476 A | 9/1984 | Cavanagh et al. |
| 4,534,726 A | 8/1985 | Simelunas |
| 4,543,053 A | 9/1985 | Jasniewski |
| 4,578,027 A | 3/1986 | Koppa et al. |
| 4,608,918 A | 9/1986 | Funabashi et al. |
| 4,671,759 A | 6/1987 | Hayashi et al. |
| 4,789,555 A | 12/1988 | Judd |
| 4,808,104 A | 2/1989 | D'Orlando |
| 4,881,889 A | 11/1989 | Spiel et al. |
| 5,162,119 A | 11/1992 | Pappas et al. |
| 5,204,125 A | 4/1993 | Larsen |
| 5,216,946 A | 6/1993 | Huang et al. |
| 5,306,133 A | 4/1994 | Dayley |
| 5,375,509 A | 12/1994 | Taylor et al. |
| 5,388,489 A | 2/1995 | Dayley |
| 5,402,715 A | 4/1995 | Kurachi et al. |
| 5,529,799 A | 6/1996 | Bornhorst et al. |
| 5,540,140 A | 7/1996 | Rubio et al. |
| 5,552,101 A | 9/1996 | Fujii et al. |
| 5,565,220 A | 10/1996 | Rubio et al. |
| 5,576,033 A | 11/1996 | Herrera |
| 5,601,012 A | 2/1997 | Ellner |
| 5,622,742 A | 4/1997 | Carollo |
| 5,641,527 A | 6/1997 | Burger |
| 5,662,949 A | 9/1997 | Rubio et al. |
| 5,667,834 A | 9/1997 | Rubio et al. |
| 5,687,638 A | 11/1997 | Makowecki |
| 5,759,608 A | 6/1998 | Momiyama |
| 5,871,783 A | 2/1999 | Capodieci |
| 6,024,554 A | 2/2000 | Lawrence |
| 6,055,897 A | 5/2000 | Mysliwiec |
| 6,168,817 B1 | 1/2001 | Pavan |
| 6,268,005 B1 | 7/2001 | Brewer |
| 6,279,440 B1 | 8/2001 | Truttmann et al. |
| 6,298,760 B1 | 10/2001 | Truttmann et al. |
| 6,305,260 B1 | 10/2001 | Truttmann et al. |
| 6,530,771 B1 | 3/2003 | Clark |
| 6,555,152 B1 | 4/2003 | Roso |
| 6,562,389 B1 | 5/2003 | Yusufi |
| 6,851,192 B2 | 2/2005 | So |
| 6,902,754 B1 | 6/2005 | Evans et al. |
| 7,331,120 B2 | 2/2008 | Scherb et al. |
| 7,421,947 B2 | 9/2008 | Bryan |
| 7,771,182 B2 | 8/2010 | Fornaguera |
| 7,828,543 B2 | 11/2010 | Herrera |
| 7,914,834 B2 | 3/2011 | Fu et al. |
| 2010/0196564 A1 | 8/2010 | Cepeda Mendoza et al. |
| 2010/0227024 A1 | 9/2010 | Flores |

FOREIGN PATENT DOCUMENTS

| | | |
|---|---|---|
| DE | 3410162 | 3/1985 |
| EP | 0130772 | 1/1985 |
| EP | 0841009 | 5/1998 |
| FR | 2195892 | 3/1974 |
| FR | 2643229 | 8/1990 |

* cited by examiner

DOUGH FORMING AND CUTTING APPARATUS AND METHOD

CROSS-REFERENCE TO RELATED APPLICATIONS

The present application represents a divisional application of U.S. patent application Ser. No. 12/644,167 entitled "Dough Forming and Cutting Apparatus and Method" filed Dec. 22, 2009, now U.S. Pat. No. 8,622,730, which claims the benefit of U.S. Provisional Patent Application Ser. No. 61/140,432 entitled "Dough Forming and Cutting Apparatus and Method" filed Dec. 23, 2008.

FIELD OF THE INVENTION

The invention pertains to the art of food production and, more particularly, to an apparatus for forming and cutting dough to form uniformly shaped boule-type dough pieces.

BACKGROUND

A number of methods have been employed in order to make various types of bread products, such as loaves, buns, rolls, biscuits, and breadsticks, from a sheet of dough. In such systems, a sheet of bread dough may typically be extruded, reduced and provided to a conveyor which conveys the sheet of dough along a dough travel path. The sheet of dough then encounters one or more cutting apparatus, such as slitter wheels, guillotine-type cutters, reciprocating head cutters or rotatable drum-type cutters. In general, such cutting techniques render a baked product having sharp edges, rather than round edges resembling a hand made product. In the past, a rounded edge product has been obtained by placing small balls of dough in rollers which roll the balls of dough into a substantially spherical shape. The dough spheres (or dough balls) are then placed in individual baking pans so that they can be baked, much as a conventional dinner roll is baked by a consumer.

Further, it is often desirable to form boule-shaped products, which require forming dough into a round shape to produce an oval or spherical ball-like bread product. Traditionally, this type of bread product was individually baked in a European boule pan in order to result in a specifically shaped product. Once boule-shaped bread products are baked, the interiors may be cut or scooped out and the hollowed loaf is then used as a "bread bowl." Still, such individual baking techniques are very low throughput techniques. To say the least, they are less than desirable for commercial applications in which it is necessary to process many pounds of dough per minute. Thus, there is a need for a process for forming boule-shaped dough products that may be efficiently used in a high speed production line.

SUMMARY OF THE INVENTION

The invention is directed to an apparatus for forming and cutting a dough sheet into a plurality of uniformly formed spherical dough products. The apparatus engages the dough sheet, which includes a first surface with a first skin and a second surface with a second skin, as it travels along a conveyor. The apparatus includes a drum, rotatably disposed relative to the conveyor, and a plurality of cutter molds disposed on the rotatable drum for engaging the dough sheet as the dough sheet moves along the dough travel path. Each of the cutter molds includes a concave internal cavity defined by a first end or upper rim, a second end or base having a flattened portion, and a curved annular side wall there between. The first end includes a peripheral edge defining a cutting portion for severing the dough sheet into the plurality of dough pieces, as well as a dough engaging portion which, in combination with the curved annular side wall, is used to shape the dough products.

In specifically, the invention is directed to forming boule-shaped dough products in a continuous production manner employing the rotatable drum provided with the various cutter molds. As the dough reaches a given cutter molds, the dough is forced into the internal cavity of the cutter mold. Given the shape of the internal cavity, the dough is shaped while the peripheral edge severs the dough which is automatically discharged from the cutter mold as a rounded, generally ball-shaped dough product which are subsequently cooked to create a boule. To assist in removal of the formed dough product from the cutter mold, an air passageway is provided in the drum for delivering air to a plurality of apertures provided in each of the cutter molds.

Additional objects, features and advantages of the invention will become more readily apparent from the following detailed description of the embodiments when taken in conjunction with the drawings wherein like reference numerals refer to corresponding parts in the several views.

DETAILED DESCRIPTION

Figure 1:
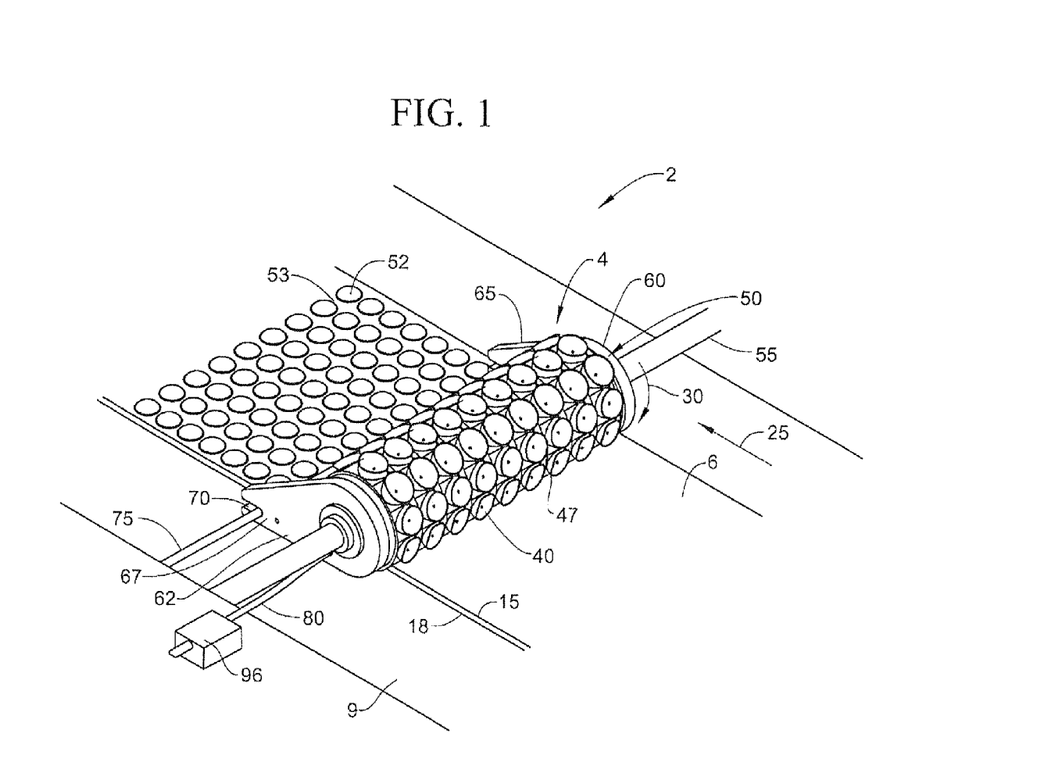
FIG. 1 illustrates a dough forming and cutting apparatus in accordance with the present invention.

With initial reference to FIG. 1, a food product assembly line 2 incorporating the dough forming and cutting apparatus 4 in accordance with the present invention is depicted. As shown, food product assembly line 2 has a sheet of dough 6 traveling from right to left upon a conveyor 9. Although not shown, it should be understood that the dough is formed in a batch maker or the like and transferred to food product assembly line 2 where it is processed into dough sheet 6 which has a first surface 15 with a first skin and a second surface 18 with a second skin. As shown in this portion of food product assembly line 2, the sheet of dough 6 is delivered by conveyor 9 to dough forming and cutting apparatus 4. As dough sheet 6 moves in the direction indicated by arrow 25, dough forming and cutting apparatus 4 rotates in the direction indicated by arrow 30. In one embodiment, conveyor 9 is capable of moving at a speed of approximately 60 ft/min, while supporting a dough sheet in the order of 2-3 inches (approximately 5-7.5 cm) thick.

Dough forming and cutting apparatus 4 includes a plurality of cutter molds, one of which is indicated at 40, disposed on an exterior surface 47 of a cylindrical, rotatably driven drum 50 for forming and cutting dough sheet 6 into a desired number of uniform shaped pieces. The plurality of cutter molds 40 are mounted relative to the conveyor 9 such that, when dough sheet 6 is traveling in the direction indicated by arrow 25, cutter molds 40 engage the dough sheet 6, receive and shape the dough and sever it to provide a plurality of cuts in dough sheet 6, resulting in the formation of individual dough products 52 and intermediate, recyclable dough pieces 53. Drum 50 can either be positively driven, or simply driven by the frictional engagement between the cutter molds 40 and dough sheet 6 or the conveyor 9. In operation, cutter molds 40 extend all the way through dough sheet 6 to lightly engage conveyor 9 and thereby completely sever dough sheet 6. Certainly, the thickness of dough sheet 6 can be changed in accordance with the invention, with a corresponding change in the size of cutter molds 40, in order to form products of varying size as discussed further below. After the cuts are made in dough sheet 6, dough sheet 6 continues traveling in the direction indicated by arrow 25 to a post processing station (not shown). The post processing station can include, for example, proofing, baking, freezing and/or packaging.

Figure 2:
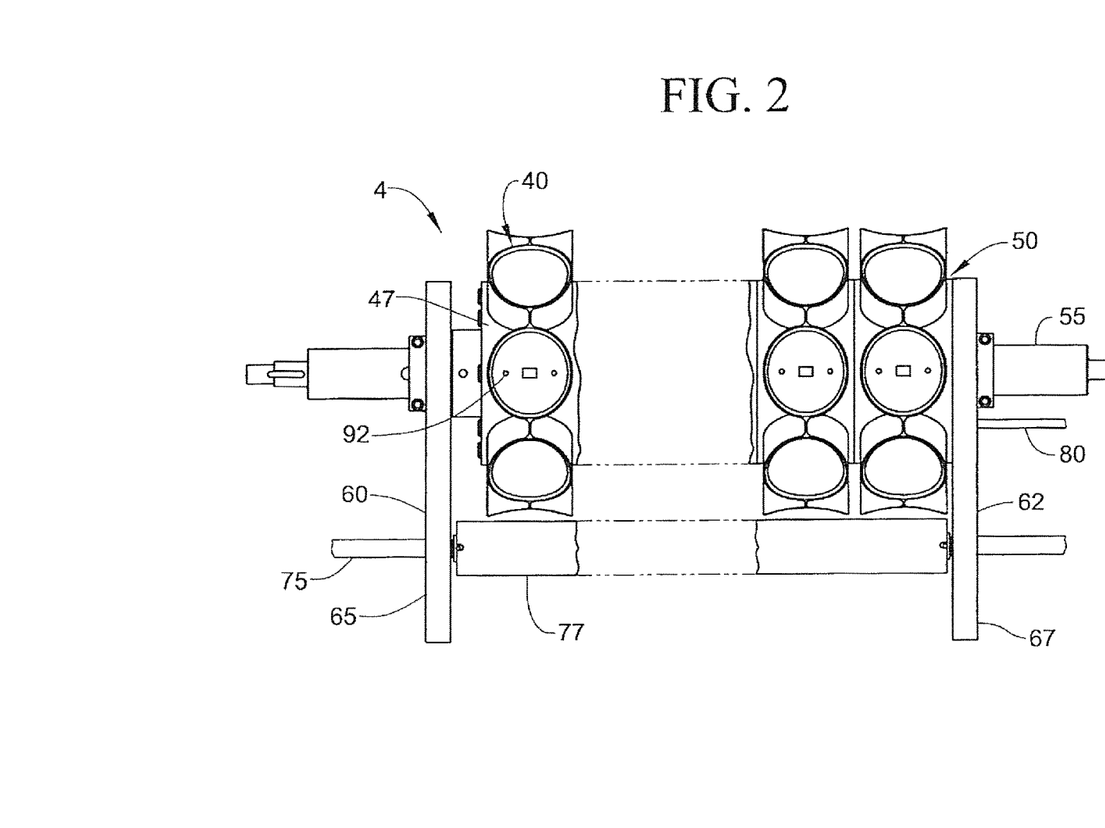
FIG. 2 is a side view of a rotary drum cutter arrangement employed into the dough forming and cutting apparatus of FIG. 1.

More specifically, with reference to FIG. 2, cylindrical drum 50 of dough forming and cutting apparatus 4 is mounted on a drive shaft 55 and includes side plates 60 and 62 on either side of cylindrical drum 50. Side plates 60 and 62 include an elongated side end portions 65 and 67 that extend in the direction of travel of the dough sheet 6. Each elongated side end portions 65 and 67 includes a notch 70 (see FIG. 1) formed therein for receiving a pivot shaft 75, which extends parallel to drive shaft 55. Pivot shaft 75 allows cylindrical drum 50 and drive shaft 55 to pivot and lift up off of the dough sheet 6 when desired, such as at the end of a production cycle. Freely rotatably mounted on pivot shaft 55 is a dough roller 77. An air supply hose 80 is provided to supply air from an air source, such as an air compressor (not shown). Air that enters cylindrical drum 50 through hose 80 is used to force the dough to be discharged from cutter molds 40 after the dough is formed and cut as will be discussed further below.

Figure 3:
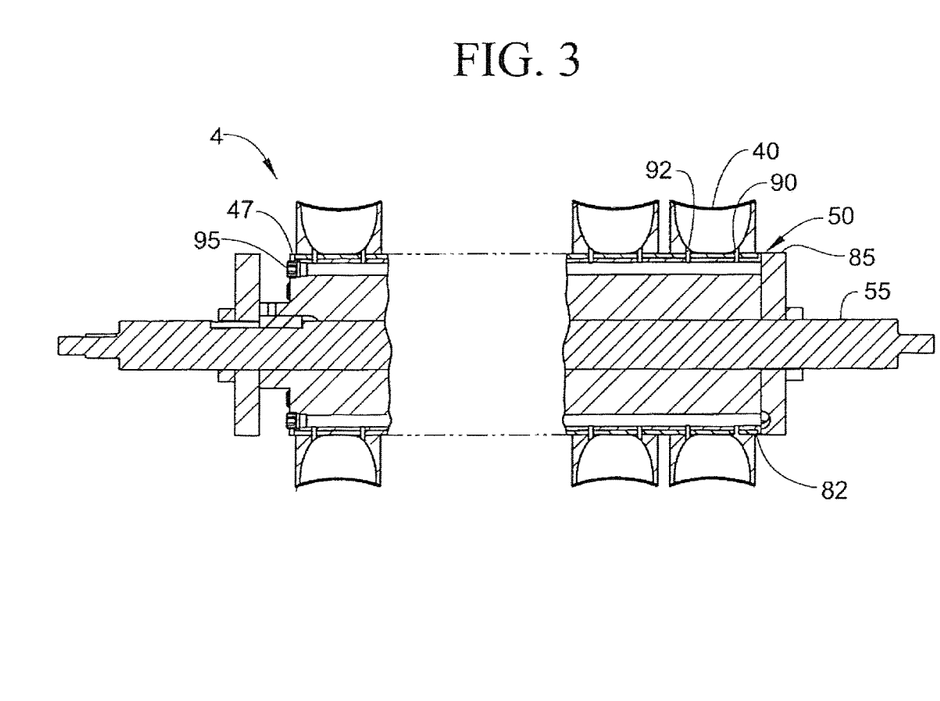
FIG. 3 is a cross-sectional view of the rotary drum cutter of FIG. 2.
Figure 4:
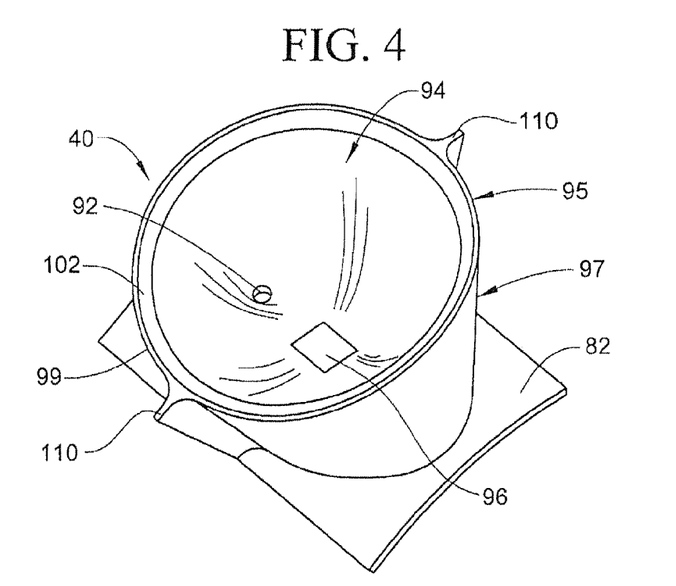
FIG. 4 is a perspective view of a cutter mold provided on the rotary drum cutter of FIG. 2.
Figure 5:
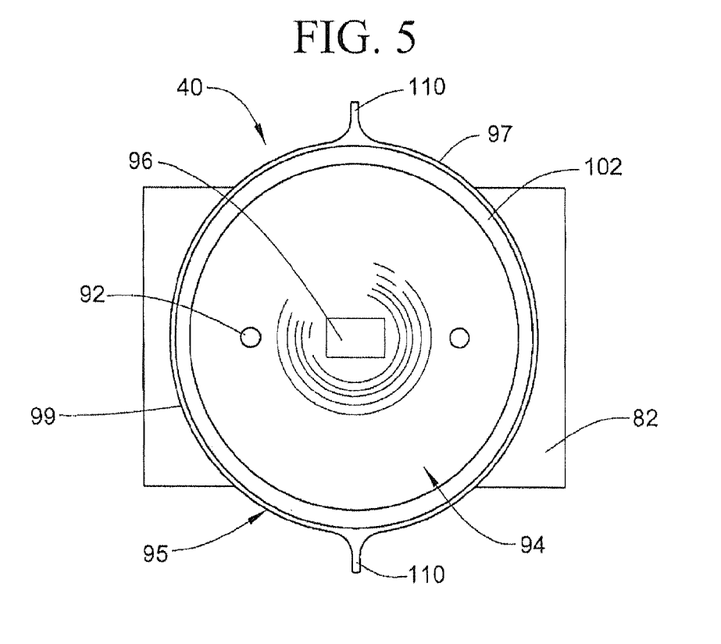
FIG. 5 is a top view of the cutter mold of FIG. 4.
Figure 6:
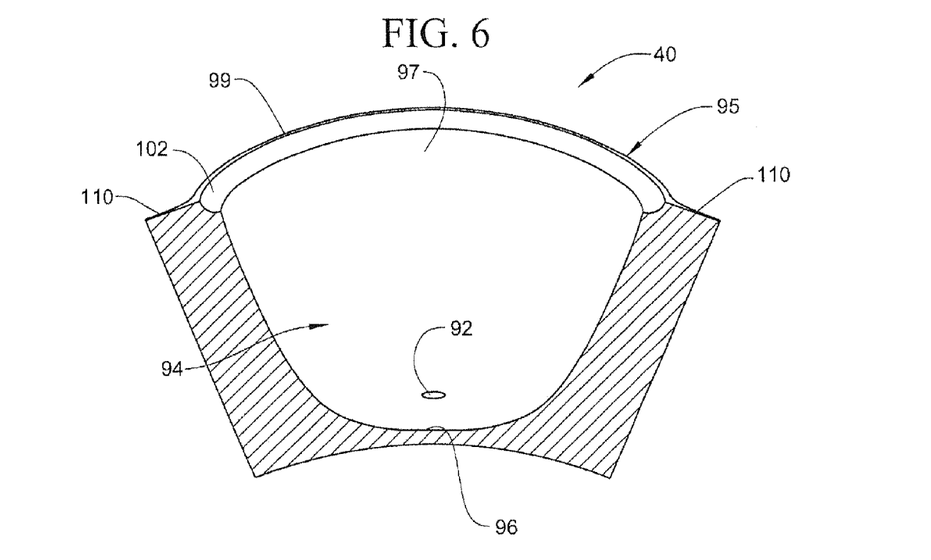
FIG. 6 is a cross-sectional side view of the cutter mold of FIG. 4.
Figure 7:
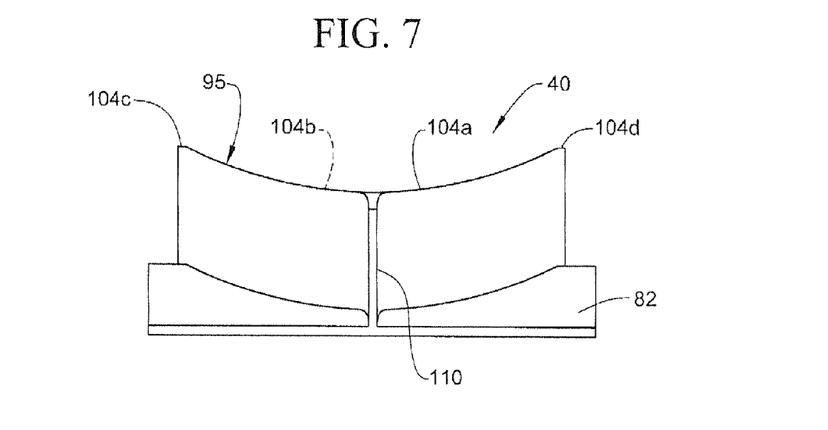
FIG. 7 is a front elevational view of the cutter mold of FIG. 4.

FIG. 3 illustrates a cross-sectional view of cylindrical drum 50 of dough forming and cutting apparatus 4. As shown, drive shaft 55 extends through cylindrical drum 50, with a plurality of the cutter molds 40 being disposed on the exterior surface 47 of cylindrical drum 50. In one embodiment, the various cutter molds 40 are provided as part of a sleeve 82 that extends about exterior surface 47 and is secured for rotation with drum 50. However, it should be realized that cutter molds 40 could also be provided directly on exterior surface 47. Although various materials could be used to form cutter molds 40, stainless steel is a preferred material. As also shown, various elongated air passageways, one of which is shown at 85, extends through cylindrical drum 50. A plurality of air outlets, one of which is indicated at 90, stems from elongated air passageway 85 to provide air to a respective one cutter mold 40. As illustrated in FIGS. 4-5, exterior surface 47 of cylindrical drum 50 and sleeve 85 have aligned apertures 92 formed therein. Each air outlet 90 is exposed to a set of apertures 92 for a respective cutter mold 40, with sets of two apertures 92 being illustrated. With this arrangement, air enters elongated air passageway 85 through hose 80, which is adapted to attach to inlet port 95 at one end and an air supply (not shown) at another end, with an air regulator 96 (see FIG. 1) interposed there between. As will be discussed further herein, air can be timely forced out apertures 92 from air outlets 90 to discharge the dough from a respective cutter mold 40. For use in connection with making boule type products, it has been found that providing 5-15 psi to the two spaced apertures 92 per cutter mold 40 is effective, although the number and relative positioning of the apertures, as well as the pressure employed, could be readily varied.

FIGS. 4-7 represent perspective, bottom, sectional side and front elevational views, respectively, of cutter mold 40 in accordance with the present invention. Each cutter mold 40 has a concave, generally bowl-shaped internal cavity 94 defined by a first end establishing an upper rim 95, a second end establishing a base 96 which is shown to be generally flat, and a curved, annular side wall 97. Upper rim 95 includes an outermost peripheral edge 99, which is thin and rather sharp, leading to a dough engaging portion 102. As shown best in FIG. 6, dough engaging portion 102 takes an arcuate or concave shape and leads to curved side wall 97. In an alternate embodiment, dough engaging portion 102 and/or side wall 97 may have a different profile, such as a sloping, tapered configuration. Regardless of the exact configuration, the combination of peripheral edge 99, dough engaging portion 102 and side wall 97 results in each dough product 52 having a generally flat bottom portion and a rounded, ball-shaped main body in order to establish a boule. Thus, rather than having its edges straight and substantially squared off like a biscuit, dough product 52 is automatically formed with a rounded shape. Thus, when dough product 52 is later baked, it has an aesthetically more desirable look, which more closely resembles a handmade boule.

Since peripheral edge 99 is thin and sharp, the cutting pressure required to cut through or sever dough sheet 6 is less than that required for a cutter which has no such cutting edge. Therefore, peripheral edge 99 actually severs dough sheet 15, while dough engaging portion 102 provides a dough engaging surface used to initiate shaping of the dough. Certainly, it is desired to make a smooth dough cut during operation. To this end, the front and rear edge portions 104a and 104b of peripheral edge 99 are specifically configured to be concave in shape, while the opposing side edge portions 104c and 104d are convex. Basically, the curvature of front and rear edge portions 104a and 104b are identical and clearly shown in FIG. 7, while the curvature of side edge portions 104c and 104d are identical and mimic the side curvature of sleeve 82 as clearly shown in FIG. 6. With this construction, there is a smooth, sloped transitional engagement with dough 6, with each cutter mold 40 smoothly transitioning from initial engagement with dough 6 by front edge portion 104a, to the subsequent engagement of side portions 104c and 104d and then to the final engagement along rear edge portion 104b. In addition, peripheral edge 99 of each cutter 40 includes radial extensions 110 for connecting adjacent cutter molds 40 and establishing intermediate dough pieces 53. The radial extensions 110 basically create additional cuts in dough sheet 6 to further facilitate removal of the individual dough products 52 after the forming and cutting operation.

Based on the above, it should be readily apparent that the dough forming and cutting apparatus of the present invention provides a number of significant advantages over prior art dough cutting systems. The present invention provides for a continuous production system to make uniformly shaped spherical or boule-type products that closely resemble hand formed boules. The particular configuration of the cutting molds enables the effective shaping and cutting operations to be performed, which again is significant as the cutting molds are rotated during operation. Furthermore, the inclusion of the timed air discharge into the cutting molds is important to the overall ability of the system to accept and shape a requisite amount of dough within the cutting mold, yet assure that the dough is timely removed from the mold. Therefore, the simultaneous cutting and stamping of dough using a rotary drum cutter with dough discharge assistance in accordance with the present invention synergistically combines to provide for a high throughput with enhanced product formation. Certainly, it should be realized that the dimensions of the dough forming and cutting apparatus of the invention could be varied, as well as the relative size of the components to form boule-type products of different sizes. Therefore, although the present invention has been described with reference to certain embodiments, it should be readily understood that various changes and/or modifications, such as the use of other dough force discharge arrangements including mechanical devices, may be made in form and detail without departing from the spirit and scope of the invention.

The invention claimed is:

1. A method of forming spherically shaped, dough products comprising:
    delivering a dough sheet, having opposing first and second surfaces, on a conveyor along a dough travel path;
    rotating a drum, having a sleeve extending about and being secured thereto supporting a plurality of cutter molds, provided in the dough travel path such that the plurality of cutter molds, provided with peripheral cutting edge portions and concaved bowl-shaped internal cavities, receive dough in the bowl-shaped internal cavities of the cutter molds to establish spherically shaped, dough products with flat bottom portions and rounded, ball-shaped main body portions while the cutting edge portions engage the dough;
    severing the dough sheet by causing a concave-shaped front end portion of each cutter mold to initially engage the dough sheet upon rotation of the drum, followed by convex-shaped opposing side portions of each cutter mold, and then a concave-shaped rear end portion of each cutter mold engages the dough sheet during rotation of the drum, with each of the convex shaped opposing side portions having a curvature which mimics a side curvature of the sleeve, wherein the plurality of cutter molds directly engage and sever the dough upon rotation of the drum to form the spherically shaped, dough products; and
    causing the dough products to be released back onto the conveyor from the bowl-shaped internal cavities.

2. The method of claim 1 wherein the dough sheet is simultaneously shaped and cut into the spherically shaped, dough products.

3. The method of claim 1 wherein the dough sheet is continuously delivered on the conveyor and the drum is continuously rotated such that the spherically shaped, dough products are continuously formed.

4. The method of claim 1 wherein causing the dough products to be released from the bowl-shaped internal cavities includes forcibly ejecting the dough products from the internal cavities.

5. The method of claim 4 wherein causing the dough products to be released from the bowl-shaped internal cavities includes injecting air into the internal cavities to forcibly eject the dough products.

6. The method of claim 5 wherein the injecting air into the internal cavities includes introducing pressurized air into the drum and transferring the pressurized air into the bowl-shaped internal cavities.

7. The method of claim 1 further comprising: simultaneously with forming the dough products, forming intermediate dough pieces between the dough products, with the intermediate dough pieces completely separating the dough products from one another.

8. The method of claim 1, wherein creating additional cuts in the dough sheet with radial extensions provided on each cutter mold, with the additional cuts facilitating removal of the spherically shaped, dough products from upon the conveyor.

9. A method for shaping and cutting a dough sheet into a plurality of spherical dough products conducted with an apparatus including a conveyor upon which a dough sheet travels, a rotatable drum mounted for rotation above the conveyor, a plurality of cutter molds disposed about the rotatable drum, each of the cutter molds including a peripheral edge portion, a dough engaging portion extending from the peripheral edge portion and having one of an arcuate shape and a sloping, tapered configuration, and a curved, annular side wall extending from the dough engaging portion and defining a concave, bowl-shaped internal dough receiving cavity having a base portion, with the peripheral edge portion establishing a cutting edge for each cutter mold wherein the cutting edge includes a front portion, a rear portion and opposing side portions, with the peripheral edge portion, the dough engaging portion, and the annular side wall, in combination, being configured to form a spherically shaped dough product and each of the opposing side portions including a curvature which is convex in shape, and a sleeve supporting the plurality of cutter molds, said sleeve extending about and being secured to the rotatable drum, while the curvature of each of the opposing side portions mimics a side curvature of the sleeve, said method comprising:
    forcing dough into the internal, dough receiving cavities of the cutter molds so that the dough is shaped by the cutter molds when the dough sheet travels in a dough travel path and the drum is rotated;
    engaging the dough with the cutting edges; and
    severing the dough sheet into a plurality of generally spherically shaped, dough products.

10. The method of claim 9 further comprising delivering air to the internal, dough receiving cavities of the cutter molds for ejecting the dough products.

11. The method of claim 9 further comprising simultaneously with severing the dough sheet into the plurality of spherically shaped dough products, forming intermediate dough pieces between the dough products, with the intermediate dough pieces completely separating the dough products from one another.

12. A method for shaping and cutting a dough sheet into a plurality of spherical dough products conducted with an apparatus including a conveyor upon which a dough sheet travels, a rotatable drum mounted for rotation above the conveyor, and a plurality of cutter molds disposed about the rotatable drum, each of the cutter molds including a peripheral edge portion and a curved, annular side wall extending from the dough engaging portion and defining a concave, bowl-shaped internal dough receiving cavity having a base portion, with the peripheral edge portion of each cutter mold including radial extensions and establishing a cutting edge for the cutter mold, with the cutting edge including a front portion, a rear portion and opposing side portions, with each of the front and rear portions being concave in shape and each of the opposing side portions being convex in shape wherein the peripheral edge portion, the dough engaging portion and the annular side wall, in combination, are configured to form a spherically shaped dough product, said method comprising:
    forcing dough into the internal, dough receiving cavities of the cutter molds so that the dough is shaped by the plurality of cutter molds when the dough sheet travels in a dough travel path while the drum is rotated;
    engaging the dough sheet with the cutting edges of the cutter molds; and severing the dough sheet into the plurality of spherical dough products, while the radial extensions create additional cuts in the dough sheet which facilitate removal of the plurality of spherical dough products from the conveyor.

13. The method of claim 12 further comprising delivering air to the internal, dough receiving cavities of the cutter molds for ejecting the dough products.

14. The method of claim 12 further comprising simultaneously with severing the dough sheet into the plurality of spherically shaped dough products, forming intermediate dough pieces between the dough products, with the intermediate dough pieces completely separating the dough products from one another.

\* \* \* \* \*